July 19, 1932.  C. B. NELSON  1,867,922
GAUGE
Filed March 19, 1929  2 Sheets-Sheet 1
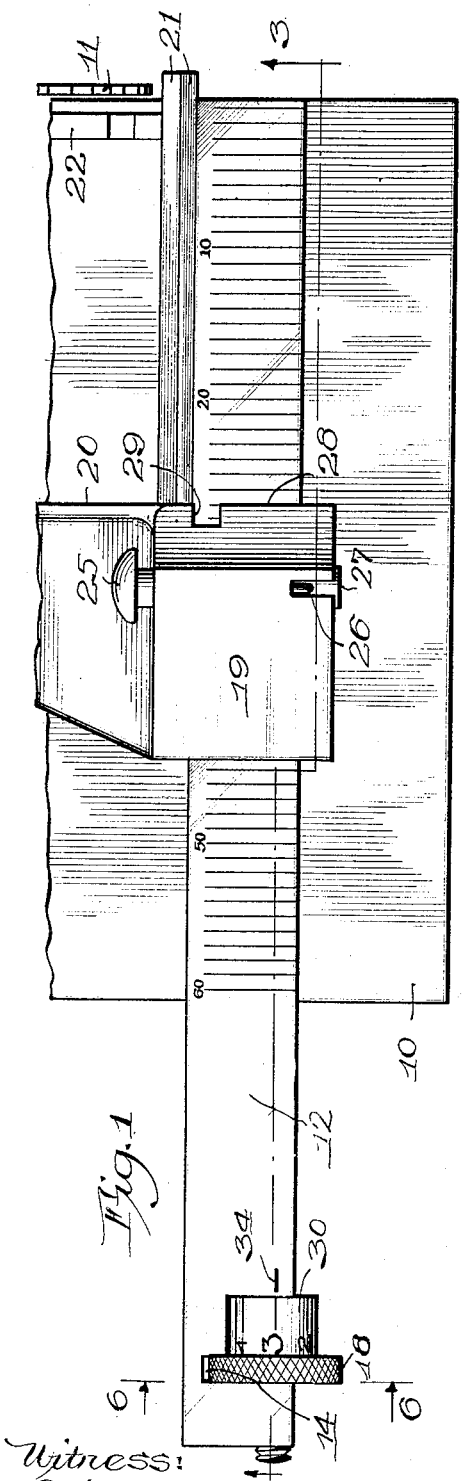
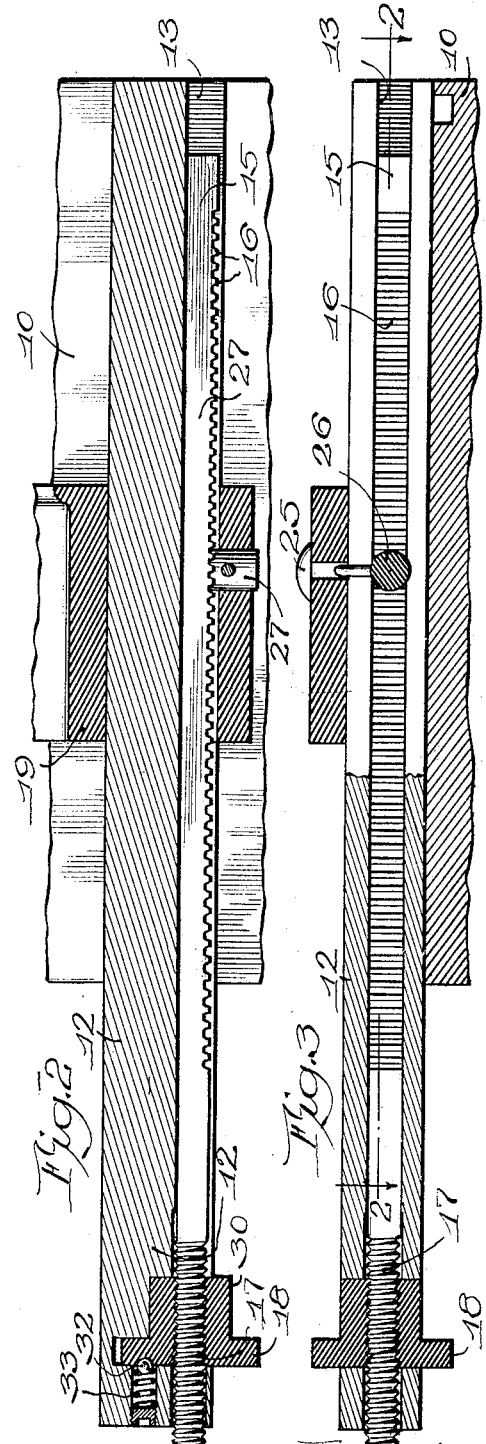

July 19, 1932.  C. B. NELSON  1,867,922
GAUGE
Filed March 19, 1929    2 Sheets-Sheet 2
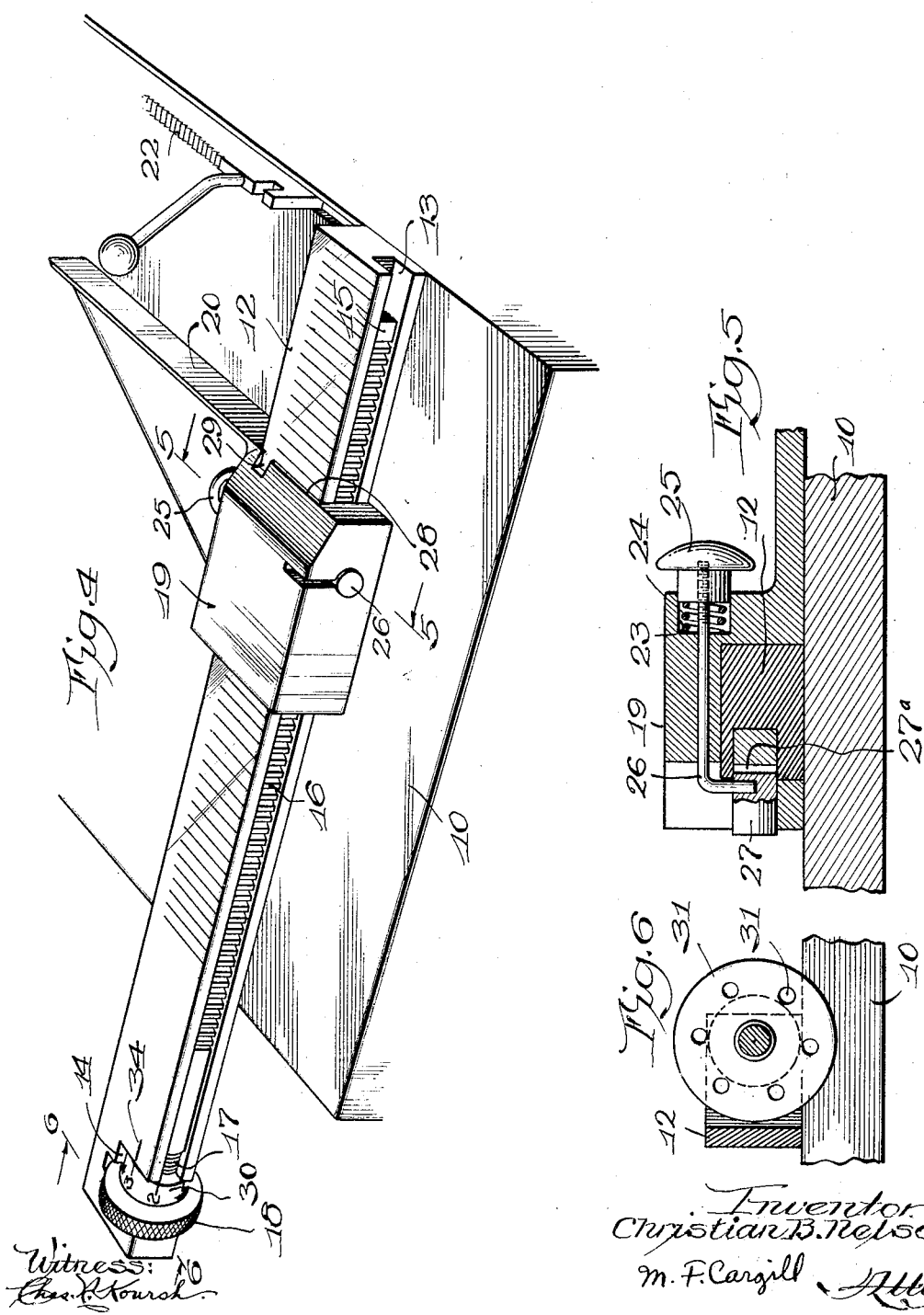

Patented July 19, 1932

1,867,922

UNITED STATES PATENT OFFICE

CHRISTIAN B. NELSON, OF CHICAGO, ILLINOIS

GAUGE

Application filed March 19, 1929. Serial No. 348,264.

This invention relates to improvements in gauges.

One object of the invention is to provide an improved gauge adapted for use in connection with a clamping device for measuring and holding pieces of material upon which a machine operation is to be performed, such as sawing or trimming for example. The particular form of the invention herein shown and described is adapted for gauging and holding linotype or like slugs which are to be sawed and trimmed to a desired length.

Another object of the invention is to provide a gauge having a stop member that can be moved readily to the desired or approximately the desired position and thereafter accurately adjusted by a fine adjustment device to insure the sawing of the slugs to the precise dimension required.

Other objects relate to various features of construction and arrangement of parts which will be apparent from a consideration of the following specification and accompanying drawings, wherein:

Fig. 1 is a top plan view of a form of gauge embodying the present improvements, the gauge being shown mounted on a movable table of a saw trimming machine.

Fig. 2 is a horizontal section taken on the line 2—2 of Fig. 3.

Fig. 3 is a vertical section taken on line 3—3 of Fig. 1.

Fig. 4 is a perspective view of the gauge and related mechanism.

Fig. 5 is a detail sectional view taken on line 5—5 of Fig. 4.

Fig. 6 is a detail section taken on line 6—6 of Fig. 1.

Saw trimming machines, in connection with which the present improvements are shown for the purpose of illustration, are used frequently in printing shops for sawing and trimming linotype slugs or the like and for other purposes. Such machines usually have a power driven saw and it is desirable that they have rotary knives or cutters which trim the sawed ends of the slugs to remove the burrs left by the saw, and to smooth and true the ends. Such a machine is disclosed and claimed in my copending application Serial No. 348,263 filed of even date herewith, and hence it will not be necessary to describe the details herein.

In the drawings 10 represents the movable table of a sawing machine which may be moved horizontally to carry the material to be sawed against the rotary saw 11 and into position to be operated on by a trimming device (not shown) if desired. Secured to the table 10 is the graduated gauge bar 12, the graduations being of a character suitable for the particular work in connection with which the device is employed. In the present illustration, the graduations are in printers' picas and are suitably numbered, as shown, for convenience, the numbering beginning at the right hand end of the bar, as shown in the drawings. The bar 12 is provided with a rectangular slot 13 along one edge, the slot terminating near the rear end of the bar in an enlarged opening 14. Positioned in the slot 13 is a stop operating slide 15 which is rectangular in cross-section and is provided with teeth 16 along the outer face thereof. The rear end of the slide 15 is cylindrical and threaded, as shown at 17. A knurled adjusting nut 18 is carried on the threaded portion 17 and is confined against longitudinal movement by the front and rear walls of the opening 14. By rotating the nut 18 the slide can be moved to and fro within a range determined by the length of the threaded portion 17.

An adjustable stop member, indicated generally by the numeral 19, is provided with a transverse slot of a width to permit it to fit over the bar 12, as shown in the drawings. The stop 19 has a vertical flange 20 disposed at right angles to the bar 12, which flange acts as a stop against which are positioned the ends of the articles to be sawed. Two slugs 21 are shown in position in Fig. 1, the slugs resting at their ends against the face of the flange 20 and against the adjacent face of the bar 12. Any suitable clamp 22, shown fragmentally, is pressed against the slugs to hold them rigidly in position during the sawing or trimming operation.

The stop member 19 is adjustable longitudinally of the bar 12 to enable the cutting of articles of any required length. On one side of the stop 19 a recess 23 is provided in which is positioned a spring 24 which bears against the inner end of the finger piece 25, and tends to move the same to the right as viewed in Fig. 5. A rod 26 extends from the finger piece 25 through an opening in the stop 19, and is bent downwardly into engagement with the catch 27. The catch has its inner end 27ª shaped to mesh with the teeth 16 of the slide 15 and thus hold stop 19 in position against accidental longitudinal movement. To adjust the stop 19 it is only necessary to press the piece 25 against the spring 24 a distance sufficient to release the catch 27 from the teeth 16, whereupon the stop is freely slidable along the bar 12, but is held against removal vertically by the upper face of the slot 13, although it can be removed by sliding it off the right hand end of the bar as viewed in Fig. 4.

The forward top portion of the member 19 is chamfered, as shown, to provide a thin edge 28 to render convenient the accurate positioning of the stop with reference to the graduations of the bar 12, a notch 29 being provided also to facilitate such operation.

The teeth 16 are spaced preferably to correspond with the graduations, that is, the distance of one pica. To set the stop at an intermediate position between two graduations, the nut 18 can be rotated, thus moving the slide 15 and stop 19 longitudinally of the bar 12. As measurements frequently are desired in fractions of a pica, the nut 18 is also graduated, as shown at 30. In the particular form shown, the graduations are 60 degrees apart and the pitch of the threads 17 is such that a complete rotation of the nut 18 will move the stop 19 the distance of one-half pica. The rear face of the nut 18 is provided with six recesses 31 into which a ball 32 snaps successively under action of the spring 33 as the nut is rotated. This arrangement prevents accidental rotation of the nut. The operator can hear the click of the ball, and as this sound occurs as the respective graduation 30 registers with the base line 34, he can count the same, each click representing the movement of the stop 19 one twelfth of a pica.

It will be seen that by having the slot 13 on the side of the bar 12 opposite the saw 11 and the material to be operated on, there is little likelihood of particles of foreign material getting into the teeth 16, and that as the catch portion 27 is enclosed within the stop 19, there is little danger of the same becoming damaged or fouled, rendering the device inaccurate. The stop member contacts closely with the bar 12 and also with the table top, and as it is moved along it pushes waste material, such as chips, from its path, thus preventing the collection of the material between such contacting surfaces, which might cause inaccuracies in gauging and binding of the parts.

Although I have shown and described a specific embodiment of my improvements for the purpose of illustration, I do not wish to be restricted specifically thereto except as so limited by the appended claim.

What I claim is:

A gauge comprising a bar having an open longitudinal recess wholly in one side thereof providing upper, lower and rear walls, a slide member adjustable longitudinally between said walls of said recess and having teeth accessible through the longitudinal opening thereof, a stop member embracing said bar, a reciprocal spring resisted plunger carried by said stop at the side thereof remote from said recess, a member secured at one end to said plunger and having its opposite end disposed adjacent said recess, and a locking member secured to said last mentioned end for engagement with said upper wall of said recess for preventing vertical displacement of said stop member and engaging also said teeth under the action of said spring for locking said stop to said slide member.

In testimony whereof, I have hereunto affixed my signature.

CHRISTIAN B. NELSON.